United States Patent

[11] 3,622,066

| [72] | Inventor | Harry M. Saferstein |
| | | Teaneck, N.J. |
| [21] | Appl. No. | 851,294 |
| [22] | Filed | Aug. 19, 1969 |
| [45] | Patented | Nov. 23, 1971 |
| [73] | Assignee | Mechanical Mirror Works, Inc. |
| | | New York, N.Y. |

[54] WRAPPER FOR A FRAMED MIRROR AND MIRROR PACKAGE FORMED THEREWITH
10 Claims, 10 Drawing Figs.

[52] U.S. Cl. ................................................. 229/40,
206/45.31, 206/46 FR, 206/62 R, 206/79, 229/87 R
[51] Int. Cl. ................................................. B65d 5/02,
B65d 25/00
[50] Field of Search ........................................... 206/45.31,
46, 60, 62, 80 R, 79; 229/40, 87 R

[56] References Cited
UNITED STATES PATENTS

| 1,813,812 | 7/1931 | Molkenthin | 206/79 |
| 1,852,922 | 4/1932 | Driver | 206/79 |
| 2,878,933 | 3/1959 | Sager | 229/16 B X |
| 3,295,674 | 1/1967 | Shore | 206/56 AA |
| 3,335,857 | 8/1967 | Saferstein | 206/62 |
| 3,370,783 | 2/1968 | Nilsson | 229/40 X |
| 3,432,028 | 3/1969 | Nathan et al. | 206/62 |
| 3,446,419 | 5/1969 | Mueller | 229/40 |

*Primary Examiner*—Joseph R. Leclair
*Assistant Examiner*—Steven E. Lipman
*Attorney*—Victor M. Helfand ABSTRACT: A wrapper for a framed mirror consisting of a unitary ply of paperboard wider and longer than the mirror, leaving wider margins on two opposed sides than on the others. Portions of the ply connected to the margins are struck out from the ply and folded over on the margins to define the mirror receiving area and to immobilize the mirror reposing thereon. Portions of the wider margins are folded over the struck out portions connected thereto and the adjacent mirror portions and the struckout portions connected to the narrower margins and are secured to the narrower margins through the struck out portions folded thereover.

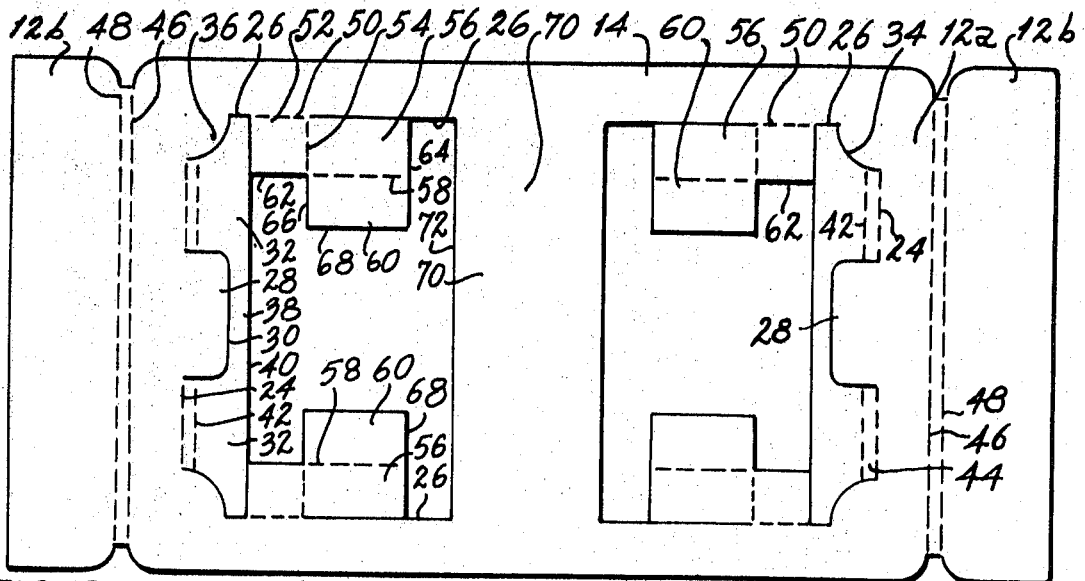
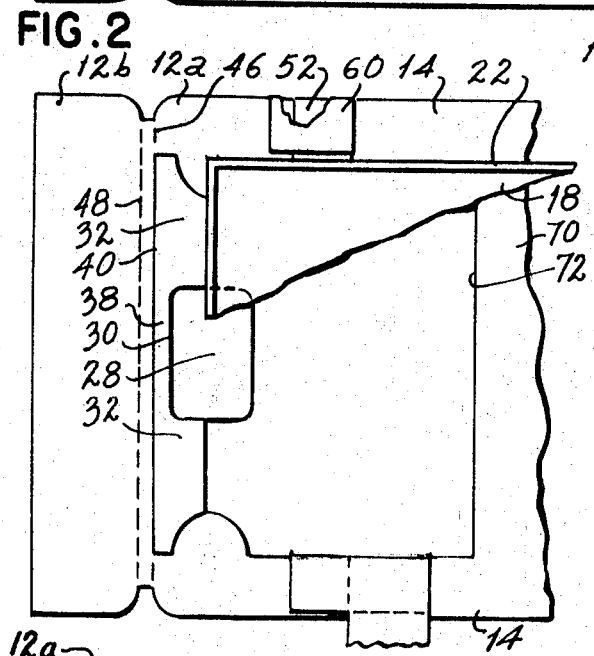
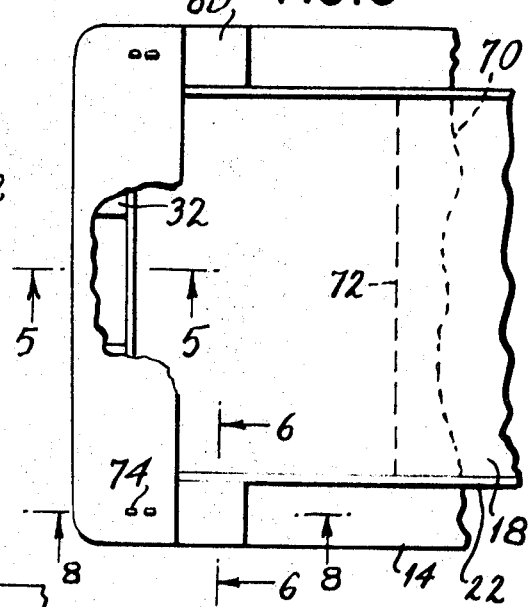
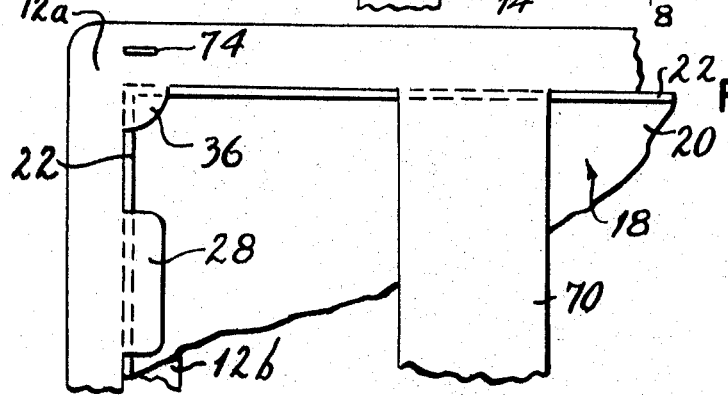

Harry M. Saferstein
INVENTOR.

WRAPPER FOR A FRAMED MIRROR AND MIRROR PACKAGE FORMED THEREWITH

Wrappers for framed mirrors of the general type to which the present invention relates generally formed of corrugated paperboard have heretofore been known and used as a replacement for corrugated casings theretofore used, in which such mirrors had previously been packaged by complete enveloping of the mirrors. Such wrappers afford a number of advantages, particularly in that, while they protect the mirrors during transportation and permit their stacking on one another in storage, yet also expose a substantial area of the mirror, at all times, for ready inspection; eliminating the need for removal of the mirror from the earlier type of casing package for the same purpose.

The present invention is directed to the improvement of such mirror wrappers.

It is, thus, an object of the present invention to provide a wrapper formed of a unitary strip or section of corrugated board to thereby effect savings in material and weight of the wrapper with consequent savings in cost of material and transportation.

It is another object of the present invention to provide a mirror wrapper of the character described in which the framed mirror is safely and securely held in substantially immobilized position by multiple-ply elements integrally connected to the blank, to thereby enhance the protection afforded by the wrapper to the enclosed framed mirror.

It is a further object of the present invention to provide a wrapper, of the character described, which exposes a maximum, uninterrupted area of the mirror for inspection.

It is a still further object of the present invention to provide a mirror wrapper, of the character described, which may be assembled with and safely and securely held around an enclosed mirror, with great ease and rapidity and with a minimum of effort.

The foregoing and other objects and advantages of the mirror wrapper of the present invention and the package formed therewith will become more readily apparent to those skilled in the art from the embodiment thereof shown in the accompanying drawing, and from the description following; it being understood that such embodiment is shown by way of illustration only, without intention of limiting the invention to the details thereof.

In the drawings:

FIG. 1 is a plan view of a blank for the wrapper of the present invention;

FIG. 2 is a fragmentary plan view of one end of the blank of FIG. 1, shown as set up to receive the mirror therein; the mirror being shown in fragment;

FIG. 3 is a view similar to that of FIG. 2, with the end of the mirror shown as secured in place;

FIG. 4 is a fragmentary view of the mirror package of FIG. 3, from the reverse side;

Generally stated, the wrapper of the invention is formed of a single ply of corrugated or like paperboard, of a greater length and width than the framed mirror to be wrapped, to provide marginal areas of the blank projecting on each side of the mirror; the margins on two opposed sides of the blank being wider than the margins on the other two sides. Flaps are struck out from the center portions of the blank that are hingedly connected to the inner edges of the marginal areas and are folded thereover to form abutments for the sides of the mirror; a portion of each wider marginal area being folded over the adjacent flap and the mirror end abutting against it and is secured to the flaps folded over add secured to the marginal areas of the other two sides and to the flaps folded thereover.

Figure 5:
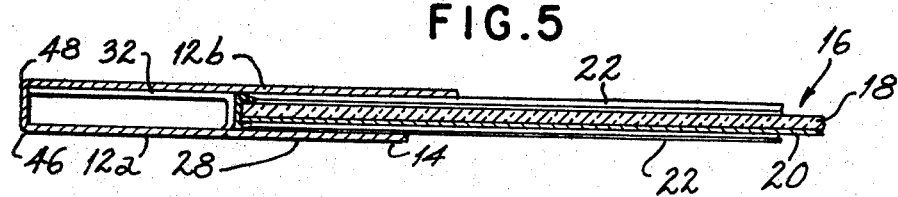
FIG. 5 is a section taken on line 5—5 of FIG. 3.
Figure 6:
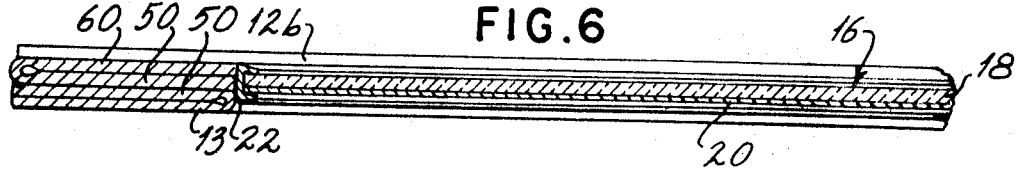
FIG. 6 is a section taken on line 6—6 of FIG. 3.
Figure 7:
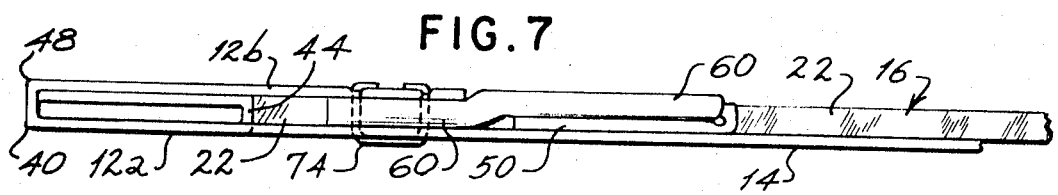
FIG. 7 is an edge view of the package of FIG. 3.
Figure 8:
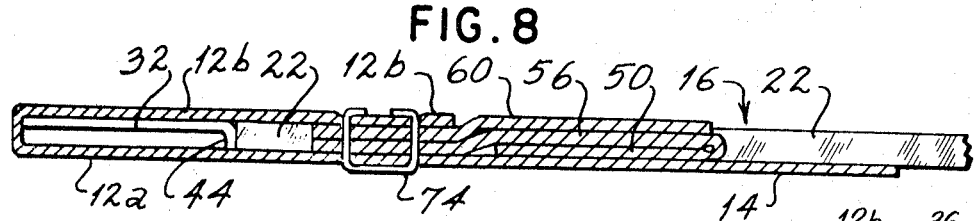
FIG. 8 is a section taken on line 8—8 of FIG. 3.
Figure 9:
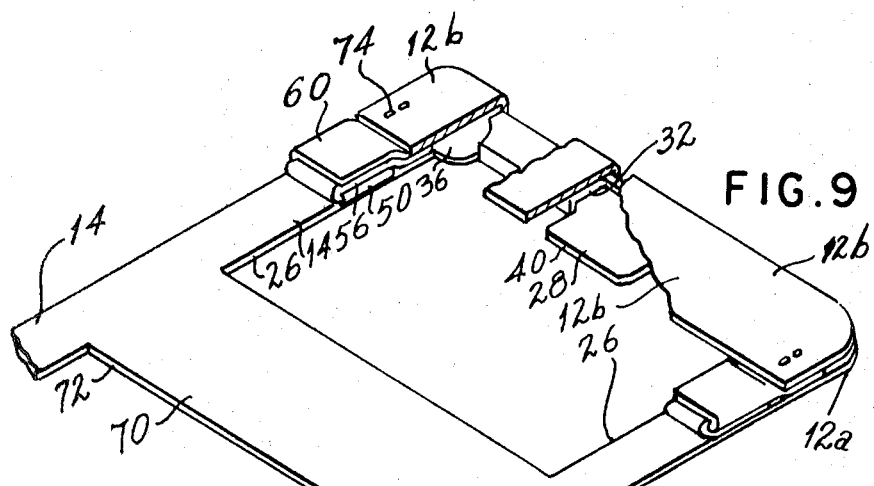
FIG. 9 is a fragmentary, perspective view of the wrapper of the package with the mirror removed and partly broken away to clarify details of construction.

More specifically stated, the mirror wrapper of the present invention, as specifically illustrated in the drawings, is shown (FIG. 1) to comprise a substantially rectangular blank, generally designated as 10, formed of corrugated paperboard, or the like, such as generally used for the purpose. The blank 10 is of greater length and width than the mirror to be packaged therein, to provide a margin each side of the mirror, with the margin at the two opposed sides of the blank being substantially wider than the margin at the two other sides thereof; such margins being designated, respectively, as 12 and 14. The mirror, generally designated as 16, is shown to comprise the mirrored glass, 18, the backing, 20 (FIGS. 5 and 6) and a relatively narrow U-shaped metal or like frame, 22, which holds the glass and backing together.

The mirror-supporting area of the blank 10 is defined from margins 12 by an interrupted fold line, 24, and from the margins 14 by an interrupted cutline, 26; both fold line 24 and cut-line 26 terminating short of the ends of the mirror-supporting area.

Figure 10:
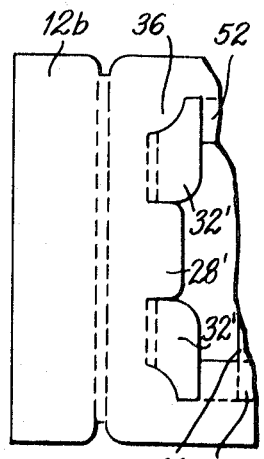
FIG. 10 is a fragmentary plan view of one end of the blank of FIG. 1, showing a modified form of the present invention.

Each fold line 24 is interrupted at its center to provide a tongue projection, 28, rigidly integral with the margins 12 in position to underlie the mirror 16, such tongue 28 being defined by a substantially U-shaped cutline, 30. Hingedly connected to margins 12 to each side of tongue 28 are flaps, 32, defined on one side by cutline 30 and on the other by a cut-line, 34, extending diagonally from each outer end of fold line 24 to cutline 26, to leave corner pieces, 36, extending into the mirror-supporting area. Preferably, the two flaps 32 may be longer than tongue 28 and are joined at their inner ends by the connecting piece, 38; flaps 32 and connecting piece 38 being defined from the center portion of the blank by cutline, 40. It should be obvious that connecting piece 38 is merely a convenience and may be omitted without detracting from the function and utility of flaps 32, as shown at 32' in FIG. 10.

Each flap 32 may be provided at its outer end inwardly of fold line 24 with a second, parallel fold line, 42, spaced from fold line 24 a distance equal to the thickness of the mirror frame 20, so that when flaps 32 are folded over the adjacent portion of the marginal areas 12a, the strip, 44, between fold lines 24 and 42, will be disposed in erect position to serve as an abutment for the adjacent edge of the mirror 16.

Each marginal area 12 is of a width preferably more than twice the altitude of a flap 32 between fold line 42 and adjacent cutline 40, and is provided at a distance from fold line 24 equal to said altitude with a first fold line, 46, extending its full length, and a second, parallel fold line, 48, spaced from fold line 24 a distance equal to the thickness of the mirror frame; such fold lines 46 and 48 permitting the end portion 12b of the marginal area 12 to be folded over flaps 32 when the latter are folded over the inner portion 12a of the marginal area 12. Preferably, the outer portion 12b of the marginal area 12 is of greater width than the inner portion thereof and of sufficient width to overlie at least a portion of the tongue 28.

Each cutline 26 is interrupted adjacent each end thereof by a relatively short fold line, 50, hingedly securing to the adjacent inner edge of the adjacent marginal area 14 a tab, 52, of approximately square area of a dimension not exceeding the width of the marginal area 14 and cut from the center of the blank and defined, at one end, by a cutline 40 and at its opposed end by the fold line, 54, which connects thereto a longer tab, 56, running parallel to the adjacent marginal area. Tab 56 is defined by its edge parallel to cutline 26 by a fold line, 58, hingedly connecting thereto a third tab, 60, coextensive therewith in length and width. Tab 52 is defined on its fourth side by cutline 62. Tabs 56 and 60 are defined at their common edge by cutline, 64, and tab 60 is additionally defined by cutlines 66 and 68.

It may here be explained that fold line 50 is so formed and arranged to permit the folding of tab 52 over an adjacent portion of a marginal area 14; fold line 54 is formed and arranged for folding tab 56 over tab 52, when the latter is in folded over position; and fold line 58 is formed and arranged to overlie folded over tab 56. It may here also be explained that, preferably, tabs 56 and 60 are longer than tabs 52 and will overlap the same in the direction of marginal area 12, when in folded over position on marginal area 14.

Cutlines 26 are each further interrupted at substantially their center by a connecting band, 70, which is defined, along its edges, but cutlines 72, which connects and secures marginal areas 14 to one another.

It will be clear that each cutline 40, defining flaps 32 and cutlines 62, 64, 66 and 68, defining tabs 52, 56 and 60, form, with cutlines 26 and 72, to each side of band 70, an interconnected severance line which severs and eliminates the area of the paperboard encompassed between such severance line, to thereby reduce the weight of the blank 10 and also expose the back of a mirror disposed thereon.

To use blank 10 for packaging a mirror therewith, flaps 32 at the two opposed ends thereof are each folded along fold line 24 over the adjacent marginal area 12a. Each tab 52 is then folded on fold line 50 over the adjacent portion of its connected marginal area 14, carrying with it tabs 56 and 60 (lower part of FIG. 6) Tab 56 is then folded over on fold line 54 over tab 52 to overlap it. Tab 60 is then folded on fold line 58 over tab 56. The mirror is then rested between strips 44 and the four sets of folded over tabs which define between them the mirror holding area of the blank and whose edges immobilize the mirror between them. It will be seen that strips 44 and the triple ply edges of the folded over tabs also provide increased protection for the edges of the mirror disposed in the area between them over tab 56. The mirror is then rested on the blank, between strips 44, erected by the folding of flaps 32, and the four sets of folded over tabs; the strip 44 and the tabs defining between them the mirror holding are of the blank and immobilize the mirror between them. It will be seen that strips 44 and the multiple-ply edges of the folded over tabs also provide protection for the edges of the mirror; the height of the several plies forming the tabs being slightly greater than the thickness of the mirror frame 22.

Portion 12b of each marginal area 12 is then folded along fold lines 46 and 48 over flaps 32, to overlap the same as well as the portions of the tabs 56 and 60 that extend beyond flaps 52, thereby also overlapping opposed end portions of the mirror resting on tongues 28, corner pieces 36 and band 70. Marginal areas 12b are then secured, as by staples, 74, to marginal area portions 14, through the overlaps of tabs 56 and 60, to complete the mirror package. It will be clear that by having tabs 56 and 60 overlap tabs 52 and having staples 74 pass through the overlaps, the thickness of the package at the stapling point is of the same number of plies as the area adjacent thereto in which all three tabs overlie the marginal area 14.

This completes the description of the mirror wrapper of the present invention and of the package it forms with a mirror. It will be apparent that because it is formed of a single ply of paperboard that may be readily die cut and scored, the wrapper of the invention may be economically produced and will form, with the mirror wrapped therein, a relatively thin and compact package, occupying a minimum of space when stacked. It will also be apparent that, for the same reason and because substantial portions of the paperboard ply are cut away and discarded, it and the package made with it will be of minimal weight. It will likewise be apparent that the wrapper of the invention may be quickly and easily and with a minimum of simple operations assembled with a mirror and will hold such mirror with maximum safety and security against displacement and against damage.

It will be further apparent that numerous modifications and variations in the mirror wrapper of the present invention may be made by any one skilled in the art, in accordance with the principles of the invention hereinabove set forth and without the exercise of any inventive ingenuity.

What I claim is:

1. A protective wrapper for a framed mirror comprising a sheet of paperboard of a length and width exceeding the length and width of the mirror to be wrapped to provide a mirror-supporting area and leave marginal areas on all sides thereof; at least one flap hingedly connected to the inner edge of two opposed of said marginal areas and being rearwardly reentrantly folded over the connected marginal area; tabs hingedly connected to the inner edge of the others of said marginal areas and being reentrantly folded over their connected marginal areas; said folded over flaps and said folded over tabs defining the borders of said mirror-supporting area and forming abutments for the edges of said mirror, the end portions of said two opposed marginal areas being reentrantly folded over the inner portions thereof and overlying said inner portions and overlapping said folded overlaps and said folded over tabs; said folded over flaps and said folded over tabs being secured to one another and to their respective marginal area portions by said overlapping end portions.

2. The protective wrapper of claim 1, said two opposed of said marginal areas being wider than the others of said marginal areas.

3. The protective wrapper of claim 2 spaced portions of the paperboard of said mirror-supporting area being struck out to leave at least one band connecting said narrower marginal areas to one another.

4. The protective wrapper of claim 3, a plurality of said flaps being hingedly connected to the inner edge of each of said two opposed marginal areas, and each said flap being defined by a fold line.

5. The protective wrapper of claim 4, each said flap being formed with a second fold line spaced from and parallel to said first fold line and defining a strip.

6. The protective wrapper of claim 5, at least one additional tab being struck out from each corner of said mirror-supporting area and being hingedly connected to each said first named tabs, each said additional tab being elongated in the direction of the adjacent wider marginal area and overlapping said first named tab to which it is connected and being secured to the end portion of its respective adjacent wider marginal area.

7. The protective wrapper of claim 2, said flaps each being defined from the adjacent wider marginal area by a fold line and each being formed with a second fold line therein parallel to said first fold line and defining with it a relatively narrow strip.

8. The protective wrapper of claim 7, said inner and outer portions of each said wider marginal areas being defined from one another by a pair of closely spaced fold lines parallel to one another and to said fold lines of said flaps.

9. The protective wrapper of claim 1, at least one additional tab being hingedly connected to each of said first named tabs and being folded thereover, each of said additional tabs being of lesser length than said first named tabs, said end portions of said wider marginal area overlying said tabs and being secured thereto.

10. The protective device of claim 1, a plurality of hingedly interconnected tabs being struck out from said mirror-supporting area at each corner thereof, one of each of said plurality of tabs being hingedly connected to a narrower marginal area portion and being folded thereover, the others of each said plurality of tabs being connected to said first tab thereof and to one another and being folded over said first tab and over one another.

* * * * *